US006431208B1

(12) United States Patent
Fulks (10) Patent No.: US 6,431,208 B1
(45) Date of Patent: Aug. 13, 2002

(54) COMBINED FULL FUNCTION ABS VALVE

(75) Inventor: Gary Chris Fulks, Dayton, OH (US)

(73) Assignee: Delphi Technologies Inc., Troy, MI (US)

( * ) Notice: Subject to any disclaimer, the term of this patent is extended or adjusted under 35 U.S.C. 154(b) by 0 days.

(21) Appl. No.: 09/653,792

(22) Filed: Sep. 1, 2000

(51) Int. Cl.$^7$ ............................................. F15B 13/044
(52) U.S. Cl. ................................. 137/596.17; 303/119.2
(58) Field of Search .................... 137/596.17; 303/119.2

(56) References Cited

U.S. PATENT DOCUMENTS

| | | | |
|---|---|---|---|
| 3,022,799 A | * 2/1962 | Padula | 137/625.65 |
| 3,970,111 A | 7/1976 | Brune et al. | |
| 4,619,289 A | * 10/1986 | Tsuru et al. | 137/596.17 X |
| 4,668,023 A | 5/1987 | Every et al. | |
| 4,679,589 A | * 7/1987 | Inden et al. | 137/596.17 |
| 4,821,770 A | 4/1989 | Parrott et al. | |
| 4,860,794 A | 8/1989 | Parrott et al. | |
| 4,944,331 A | 7/1990 | Tackett | |
| 5,005,919 A | 4/1991 | Shuey et al. | |
| 5,125,432 A | * 6/1992 | Fuji et al. | 137/596.17 |
| 5,218,996 A | * 6/1993 | Schmitt-Matzon | 137/596.17 |
| 5,299,859 A | 4/1994 | Tackett | |
| 5,488,973 A | 2/1996 | Yamamuro | |
| 5,704,395 A | 1/1998 | Kim | |

\* cited by examiner

*Primary Examiner*—Gerald A. Michalsky
(74) *Attorney, Agent, or Firm*—Robert M. Sigler (57) ABSTRACT

A full function antilock brake valve including a master cylinder port, a wheel port, and an accumulator port. The valve includes a first fluid path coupling the wheel port and the master cylinder port, and a second fluid path coupling the wheel port and the accumulator port. The valve has a normally open valve portion for controlling the flow of fluid through the first fluid path, and the normally open valve portion includes an armature having a plunger that engages a seat. The first fluid path includes an inflow portion that delivers flow from the wheel port to the normally open valve portion. The valve further includes a normally closed valve portion for controlling the flow of fluid from the wheel port to the accumulator port, the normally closed valve portion including an armature having a plunger that engages a seat. The valve further comprises a coil located radially outwardly of the normally open valve portion and the normally closed valve portion such that the coil controls the actuation of the normally open valve portion and the normally closed valve portion when sufficient current is passed through the coil. At least part of the inflow portion of the first fluid path is located radially inside the coil.

5 Claims, 6 Drawing Sheets

COMBINED FULL FUNCTION ABS VALVE

TECHNICAL FIELD

The present invention is directed to a full function valve for an anti-lock brake system, and more particularly, to a full function valve for an anti-lock brake system that includes improved portings for ease of mounting the valve.

BACKGROUND OF THE INVENTION

A conventional anti-lock brake system ("ABS") monitors the wheels of a vehicle during braking and institutes corrective action when the one or more of the wheels begin to slip or lock up. When a wheel begins slipping, the ABS reduces the pressure applied by the brake of that wheel. Once the wheel begins turning again, the system gradually reapplies the pressure in the brake until the wheel begins slipping again. A specially designed ABS valve is utilized to implement this control algorithm.

Figure 1:
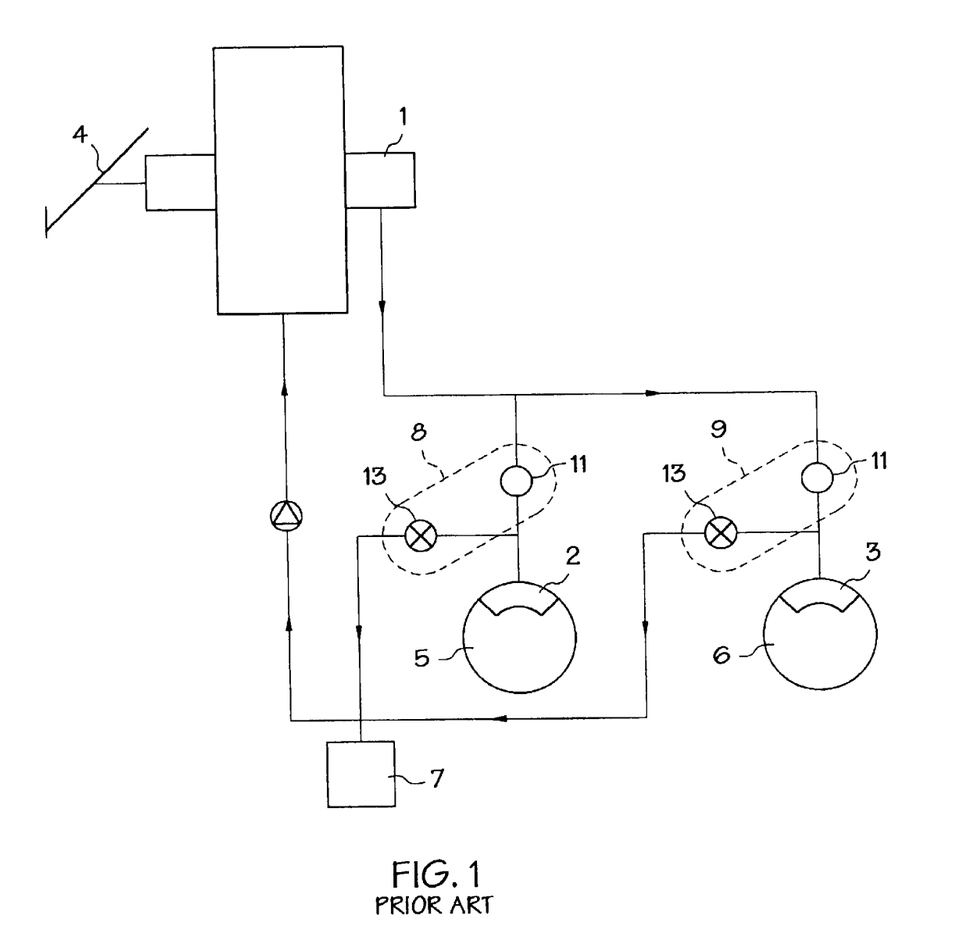
FIG. 1 is a schematic diagram of a prior art brake system for a motorized vehicle.

A typical prior art braking system is shown in FIG. 1 and includes a master cylinder 1 that supplies pressurized brake fluid to a set of brakes 2, 3 in response to pressure applied the pedal 4. The increase in pressure in the brakes 2, 3 causes the brakes to apply a decelerating torque on associated wheels 5, 6. The braking system also includes an accumulator 7 that receives brake fluid that is bled from the brakes 2, 3 to reduce the braking torque applied by the brakes. The ABS valves 8, 9 are coupled to the brakes 2, 3, to the master cylinder 1 and to the accumulator 7. Each of the valves 8, 9, includes a normally open valve portion 11 and a normally closed valve portion 13. Each of the valves 8, 9 has three states: (1) the apply state (i.e. normal braking), in which pressure conveyed by brake fluid from the master cylinder 1 is transmitted to the brakes 2, 3 to cause the brakes to apply braking torque to the associated wheels 5,6; (2) the release state, in which pressure is bled from brakes 2, 3 to the accumulator 7 to reduce the braking torque applied to the associated wheels; and (3) the hold state, in which the pressure in the brakes (and thus the applied braking torque) is held at a relatively constant level.

When the valves 8, 9 are in the apply state, the normally open.valve portions 11 are open (i.e. unactivated) and the normally closed valve portions 13 are closed (i.e. unactivated). When the braking system is in the release state, the normally open valve portions 11 are closed (activated), and the normally closed valve portions 13 are open (activated). When the system is in the hold state, the normally open valve portions 11 are closed (activated), and the normally closed valve portions 13 are closed (unactivated).

Typical full function ABS valves include a normally open valve portion and a normally closed valve portion mounted in a single longitudinal body. The normally open and normally closed valve portions are typically actuated by a single coil and are axially spaced from each other along the length of the valve body. The valve body includes three ports: a port to the master cylinder, a port to the brake, and a port to the accumulator.

U.S. Pat. No. 3,970,111 to Brüne et al. discloses a conventional electromagnetic 3-way valve arrangement having two valve portions for use in an ABS. The valve includes ports for the master cylinder, accumulator, and brake. The ports for the accumulator and for the brake are located on one end of the valve body, and the port for the master cylinder is located on the opposite end of the valve body. Because the ports for the accumulator and the brake are located adjacent to each other and they may be received in a standard ported block. However, a separate line must be run to connect the master cylinder port of the valve body to the master cylinder. Thus, for example, a tube or other conduit must be run externally of the valve to the pressure source. This external tubing increases the required connections and complexity of the valve system. Accordingly, there is a need for a full function valve for use in an ABS wherein all of the connections for all three ports are located on one end of the valve such that the valve may be received in a block that completes all of the fluid connections.

SUMMARY OF THE INVENTION

The present invention is a full function valve for use in an ABS wherein the ports for the master cylinder, accumulator and brake are all located on one end of the valve, which reduces the required connections and the overall complexity of the valve. In particular, because all of the ports are located at one end of the valve, the valve can be received in a block that acts as a manifold to connect all of the ports to the associated components. This eliminates the use of any external tubing, and keeps all connections to and from the normally open valve portion and the normally closed valve portion internal to the valve body.

It is important to guide the fluid within the valve without disrupting the magnetic flux paths that are required to activate the valve portions since the normally open valve portion is axially spaced from the normally closed valve portion. The present invention includes fluid path arrangements, as well as a magnetic body, both of which minimize disruptions of magnetic flux paths.

In a preferred embodiment, the present invention is a full function antilock brake valve which includes a master cylinder port, a wheel port and an accumulator port. The valve includes a first fluid path coupling the wheel port and the master cylinder port and a second fluid path coupling the wheel port and the accumulator port. The valve has a normally open valve portion for controlling the flow of fluid through the first fluid path, and the normally open valve portion includes an armature having a plunger that engages a seat. The first fluid path includes an inflow portion that delivers flow from the wheel port to the normally open valve portion. The valve further includes a normally closed valve portion for controlling the flow of fluid from the wheel port to the accumulator port, the normally closed valve portion including an armature having a plunger that engages a seat. The valve further comprises a coil located radially outwardly of the normally open valve portion and the normally closed valve portion such that the coil controls the actuation of the normally open valve portion and the normally closed valve portion when sufficient current is passed through the coil. At least part of the inflow portion of the first fluid path is located radially inside the coil.

Accordingly, it is an object of the present invention to provide a full function ABS valve which is easy to connect to an ABS system; an ABS valve which includes all three ports at one end of the valve; and an ABS valve which reduces the secondary air gaps in the valve.

Other objects and advantages of the present invention will be apparent from the following description, the accompanying drawings and the appended claims.

DETAILED DESCRIPTION OF THE PREFERRED EMBODIMENT

Figure 2:
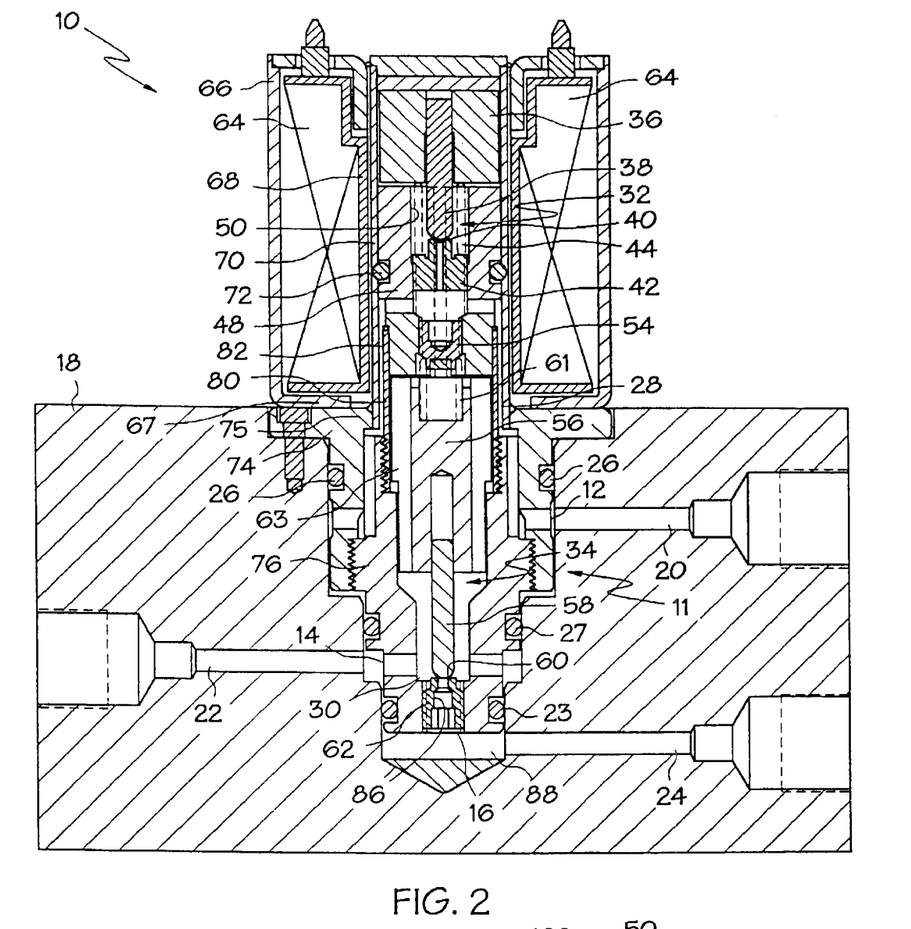
FIG. 2 is a side elevation in section of a preferred embodiment of the full function ABS valve of the present invention, shown mounted in a block.

As shown in FIG. 2, the present invention is a full function antilock brake valve 10 for an automotive vehicle. However, it is within the scope of the invention to employ the valve 10 in other, non-automotive applications. The valve 10 includes a segmented valve body, generally designated 11, which includes a master cylinder port 12, a brake port 14 (also termed a wheel port) and an accumulator port 16. The brake valve 10 is received in a block 18 that includes a master cylinder path 20, a wheel path 22, and an accumulator path 24. The master cylinder path 20 couples the master cylinder port 12 to an associated master cylinder (not shown). The wheel path 22 couples the wheel port 14 to an associated brake (not shown), and the accumulator path 24 couples the accumulator port 16 to an associated accumulator (not shown). A set of seals 23, 26, 27, such as O-rings or gaskets, are located between the block 18 and the valve 10 to isolate each respective fluid path and port from the adjacent fluid paths and ports.

The body 11 of valve 10 includes a first fluid path 28 that connects the master cylinder port 12 to the wheel port 14, as will be described below. The valve body 11 also includes a second fluid path 30 that connects the wheel port 14 to the accumulator port 16, as will be described below. The valve 10 also includes a normally open valve portion 32 that controls the flow of fluid through the first fluid path 28 and a normally closed valve portion 34 that controls the flow of fluid through the second fluid path 30. The normally open valve portion 32 includes an armature 36 that has a plunger 38 that engages a seat 40 formed on an upper seat body 42 when the normally open valve portion 32 is closed. A spring 44 is located between the upper seat body 42 and the armature 36 to bias the armature 36 in the open position. Thus, when the normally open valve portion 32 is open, the plunger 38 is retracted from the seat 40 such that fluid can flow from the master cylinder port 12 to the wheel port 14. In contrast, when the normally open valve portion 32 is closed, the plunger 38 engages the seat 40 such that fluid is blocked from flowing from the master cylinder port 12 to the wheel port.

Figure 3:
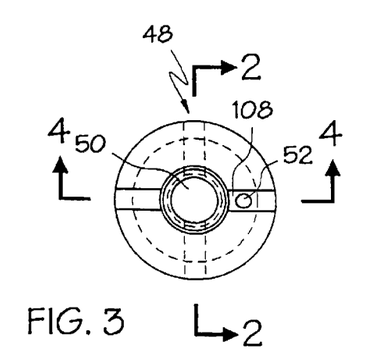
FIG. 3 is a top plan view of the intermediate stator of the valve of FIG. 2.
Figure 4:
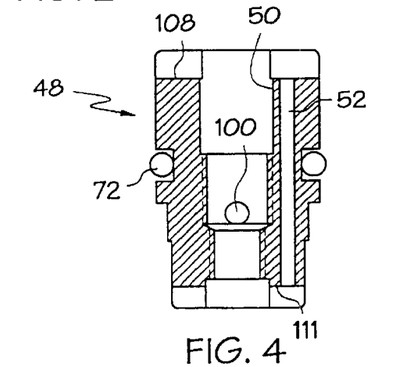
FIG. 4 is a side elevation in section of the intermediate stator of FIG. 3.

The valve 10 includes an intermediate stator 48 having a central bore 50 and an offset bore 52 (see FIGS. 3–4). The upper seat body 42 is located in the central bore 50 (see FIG. 2). A stopper 54 is located in the lower portion of the intermediate stator 48 to prevent fluid from flowing down through the central bore 50 of the intermediate stator 48. The stopper 54 may also be integrally formed with the intermediate stator 48. The intermediate stator 48 is preferably made from ferromagnetic material.

The normally closed valve portion 34 includes an armature 56 having a plunger 58 that engages a seat 60 formed on a lower seat body 62. The armature 56 includes a plurality of longitudinally-extending grooves or slots 63 therein. A spring 61 is located between the armature 56 and the intermediate stator 48 to bias the plunger 58 against the seat 60 in a closed position. When the normally closed valve portion 34 is open, the plunger 58 is retracted from the seat 60 such that fluid can flow from the wheel port 14 to the accumulator port 16. When the normally open valve portion 34 is closed, the plunger 58 engages the seat 60 to block fluid from flowing from the wheel to the accumulator.

A solenoid coil 64 having an outer casing 66 and a bobbin 68 is located radially outwardly of the armature 56 of the normally closed valve portion 34 and the armature 36 of the normally open valve portion 32. The coil 64 is also located radially outwardly of the intermediate stator 48. The outer casing 66 is made of ferromagnetic material and the bobbin 68 is non-magnetic; i.e. made of plastic, stainless steel or the like. An upper tube 70 is located radially inwardly of the bobbin 68, and is preferably made of stainless steel or other non-magnetic material. The armature 36 of the normally open valve portion 32 slides within the upper tube 70, and a seal or gasket 72 is located between the intermediate stator 48 and the upper tube 70. The lower end 67 of the outer casing 66 abuts on an outer body 74 made of ferromagnetic material, which threadedly receives a central body 76 therein. Of course, various means of attaching the magnetic body 74 to the central body 76, including welding, may be used without departing from the scope of the invention. Outer body 74 and central body 76 are components of body 11.

The armature 56 of the normally closed valve portion 34 and the lower end of the intermediate stator 48 are contained within a lower tube 80. The intermediate stator 48 is received within the lower tube 80 in a close-tolerance fit, and the armature 56 is free to move axially relative the lower tube 80. The intermediate stator 48 is preferably welded to the outer tube 80. The lower tube 80 is threadedly coupled or welded to the central body 76, and is located radially inwardly of the upper tube 70. A radial gap 82 is located between the upper tube 70 and the lower tube 80.

A controller (not shown) controls the operation of the brake valve 10. When sufficient current is passed through the solenoid coil 64 to energize it, the normally open armature 36 shifts to the closed position such that the plunger 38 engages the seat 40. Similarly, when a sufficient current is passed through the solenoid coil 64, the normally closed armature 56 shifts to an open position such that the plunger 58 is retracted from the seat 60. When a current is passed through the coil 64, the armatures 36, 56 are attracted towards the intermediate stator 48 to reduce the flux path, which causes them to move toward their activated positions. During normal operation of the ABS, the normally closed 34 and normally open 32 valve portions are not activated, therefore the normally open valve portion 32 is open and the normally closed valve portion 34 is closed. The valve 10 is shown in this position in FIG. 2. In this state, fluid flows through the first fluid path 28 and does not flow through the second fluid path 30. Thus, in the default position the valve 10 is in the apply state wherein fluid flows from the master cylinder path 20 to the wheel path 22 to cause the brake to apply braking torque to an associated wheel (not shown).

When the wheel begins to lock up, the controller signals the valve 10 to shift to the hold position to block fluid from flowing from the master cylinder path 20 to the wheel path 22. To attain the hold position, the normally open valve portion 32 is activated while the normally closed valve portion 34 remains unactivated. In order to attain the hold position, a sufficient current is passed through the coil 64 to cause the armature 36 of the normally open portion 32 to move to the closed position. When the valve 10 is in the hold position, the pressure of the fluid in the brake (not shown) is held at a relatively constant level.

After reaching the hold position, the valve 10 may shift to the release position to enable fluid to flow from the wheel port 22 to the accumulator port 24. This reduces the applied brake pressure to enable the wheel to rotate again. To attain the release position the normally closed valve portion 34 is activated while the normally open valve portion 32 remains activated. In order to activate the normally closed valve portion 34, the level of current in the coil 64 is increased until the armature 56 of the normally closed valve portion 34 moves to the closed position.

After sufficient brake pressure is bled or "released" from the wheel port 22, the wheel stops slipping and begins to roll on the pavement again. At this time, the valve 10 returns to the hold position, and then to the apply position to increase brake pressure to increase the braking torque. The controller controls the valve 10 to switch between the apply and hold positions until the wheel begins to lock up again, at which point the valve 10 again switches to the release position. Thus the valve 10 begins operation in the apply position, and can then be activated into the hold position. From the hold position, the valve 10 may switch to either the release position, or return to the apply position. From the release position, the valve can only return to the hold position.

The springs 44, 61 in the normally open 32 and normally closed 34 valve portions have spring constants such that the normally open valve portion 32 is activated at a lower level of current than is required to activate the normally closed valve portion 34. That is, all other variables being equal, the spring 61 in the normally closed portion 34 has a higher spring constant, or is stiffer, than the spring 44 in the normally open valve portion.

Figure 5:
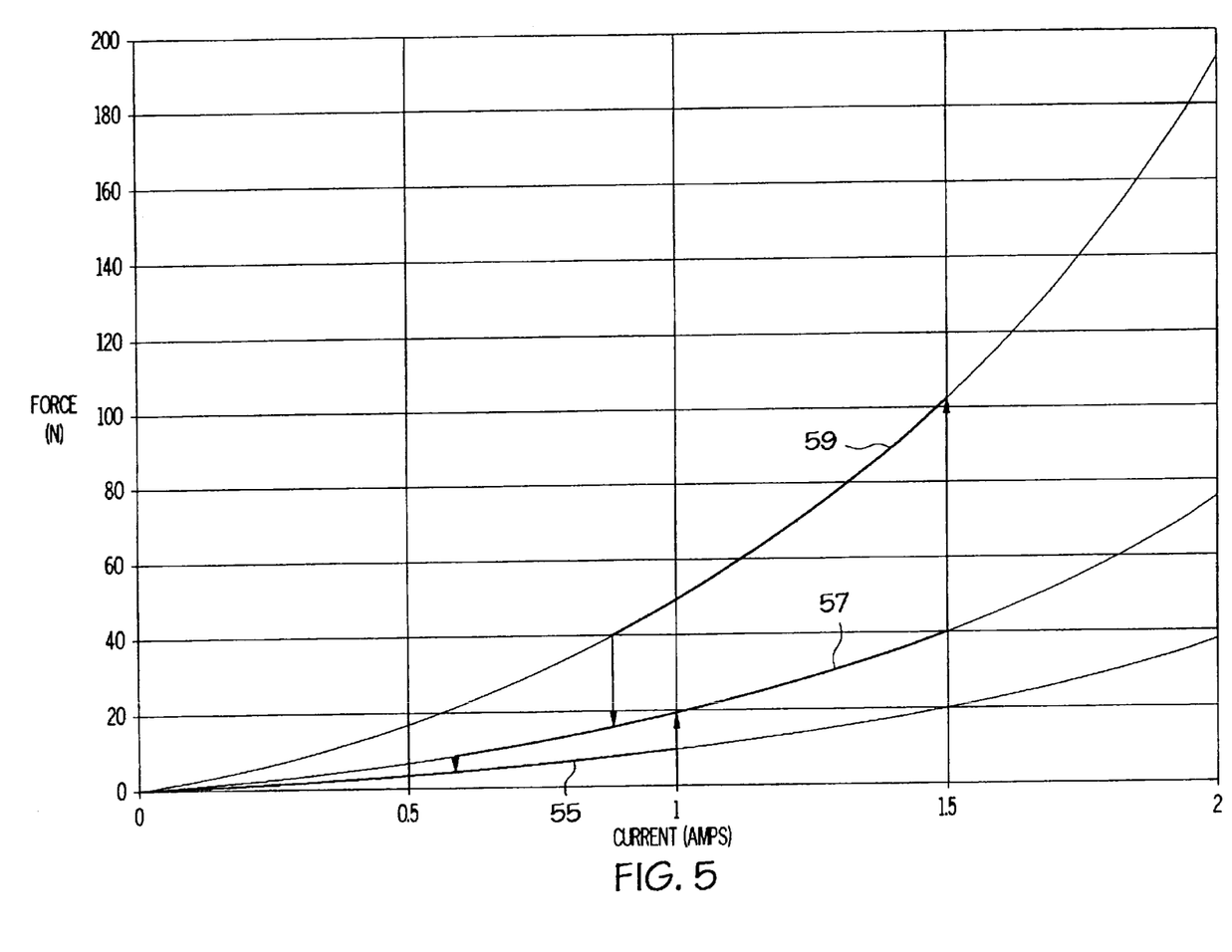
FIG. 5 is a graphical representation of the state of the valve of FIG. 2 as a function of current.

FIG. 5 illustrates the status of the valve 10 as a function of the current passed through the coil 64. The vertical axis represents the force experienced by the armatures 36, 56, at varying levels of current. At a current of below about 1 amp, the valve 10 is in the apply position and neither valve portion 32, 34 is activated. This state of the valve 10 is shown as curve segment 55. At a current of about 1 amp, the magnetic force on the armature 36 overcomes the opposing force provided by the spring 44, thereby shifting the normally open valve portion 32 to the closed position which blocks fluid in the first fluid path 28. In this state, the valve is in the hold position, shown as curve segment 57. The increase in force at about 1 amp is due to the increased flux path in the valve 10. If the current in the coil continues to increase, at about 1.5 amps the force on the armature 56 overcomes the opposing force provided by the spring 61, thereby shifting the normally closed valve 34 to the open position. This thereby opens the second fluid path 30 and switches the valve 10 to the release position. The state of the valve in the release portion is illustrated by curve segment 59. From the release position 59, the valve 10 may be returned to the hold position 57 by reducing the current in the coil 64 to about 0.9 amps. From the hold position 57, the valve 10 may be switched to the apply 55 position by reducing the current to about 0.6 amps. Alternately, the valve may be returned to the release position 59 from the hold position 57 by again increasing the current to about 1.5 amps.

Figure 6:
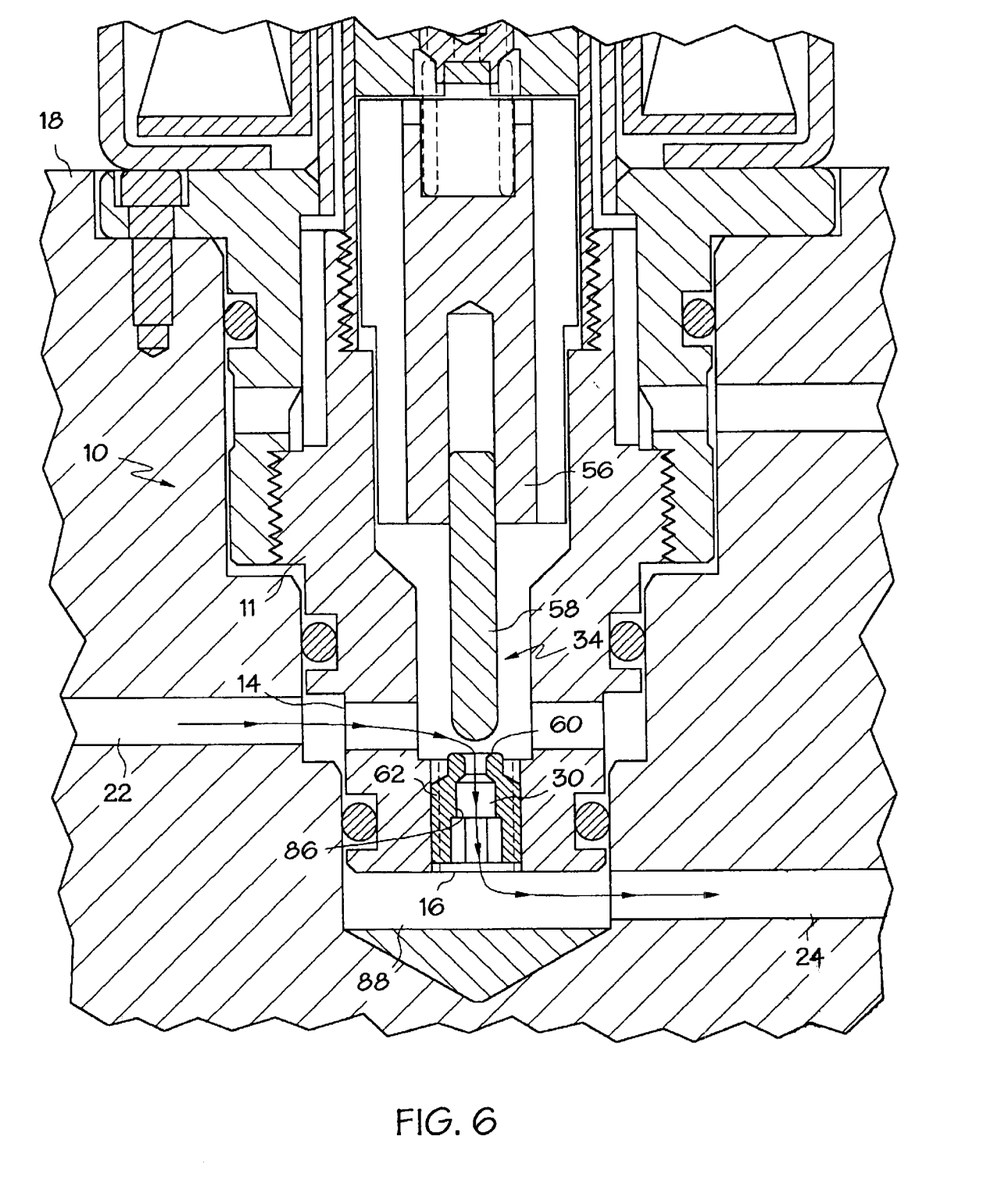
FIG. 6 is a detail side elevation in section of a lower portion of the valve of FIG. 2, illustrating the second fluid path.

As noted earlier, the second fluid path 30 couples the wheel port 14 and the accumulator port 16, and the normally closed valve portion 34 controls the flow of fluid through the second fluid path 30. When the normally closed valve portion 34 is activated, the plunger 58 is retracted from the lower seat 60 (FIG. 6), and fluid enters the second fluid path 30, and flows through the central bore 86 in the lower seat body 62. (The retraction of the plunger 58 in FIG. 6 is exaggerated for ease of illustration.) Fluid then exits the valve 10 through the accumulator port 16, and is received in a chamber 88. From the chamber 88, fluid may enter and flow through the accumulator path 24 in the block 18. In this manner, fluid flows from the wheel to the accumulator when the normally closed valve portion 34 is activated. The flow path through the second fluid path 30 is shown as a series of arrows in FIG. 6.

Returning to FIG. 2, the first fluid path 28 couples the master cylinder port 12 and the wheel port 14. As noted earlier, the normally open valve portion 32 controls the flow of fluid through the first fluid path 28. The flow of fluid in the first fluid path 28 from the master cylinder port 12 to the wheel port 14 is shown in FIGS. 7–8.

Figure 7:
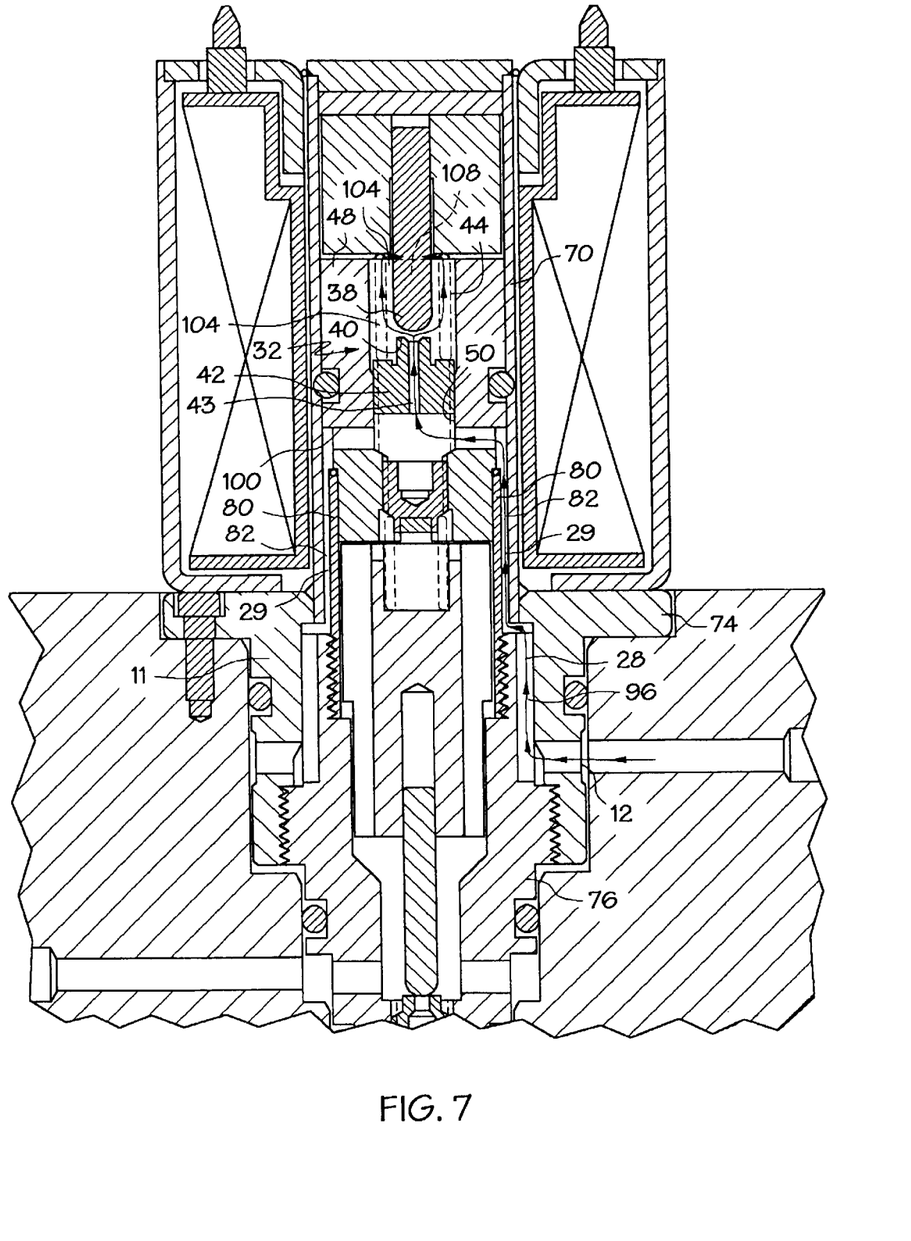
FIG. 7 is a detail side elevation in section of an upper portion of the valve of FIG. 2, illustrating a part of the first fluid path.

With reference to FIG. 7, a partial length of the first fluid path 28 is shown by a series of arrows. Fluid entering the master cylinder port 12 flows upward in a slot 96 in the central body 76. Flow then continues upwardly in the gap 82 between the lower tube 80 and the upper tube 70. The fluid path 28 then shifts laterally towards the center of the valve 10, and flows through a laterally extending bore 100 in the intermediate stator 48 (also seen in FIG. 4). The fluid path 28 then extends vertically upward through the central bore 50 formed in the intermediate stator 48, and through a bore 43 formed in the upper seat body 42 that is received inside the central bore 50. When the normally open valve 32 is closed, the plunger 38 engages the seat 40 on the upper seat body 42 to block the flow of fluid at this point. The portion of the fluid path 28 that delivers fluid from the master cylinder port 12 to the normally open valve portion 32 is termed the inflow portion 29 of the first fluid path 28.

When the normally open valve 32 is open, fluid enters the upper chamber 104 in the intermediate stator 48 that includes the spring 44 therein. Fluid then enters the upper slot 108 on the intermediate stator 48 (FIGS. 3–4), and then begins flowing downwardly through an offset bore 52 in the intermediate stator 48 (FIG. 4).

Figure 8:
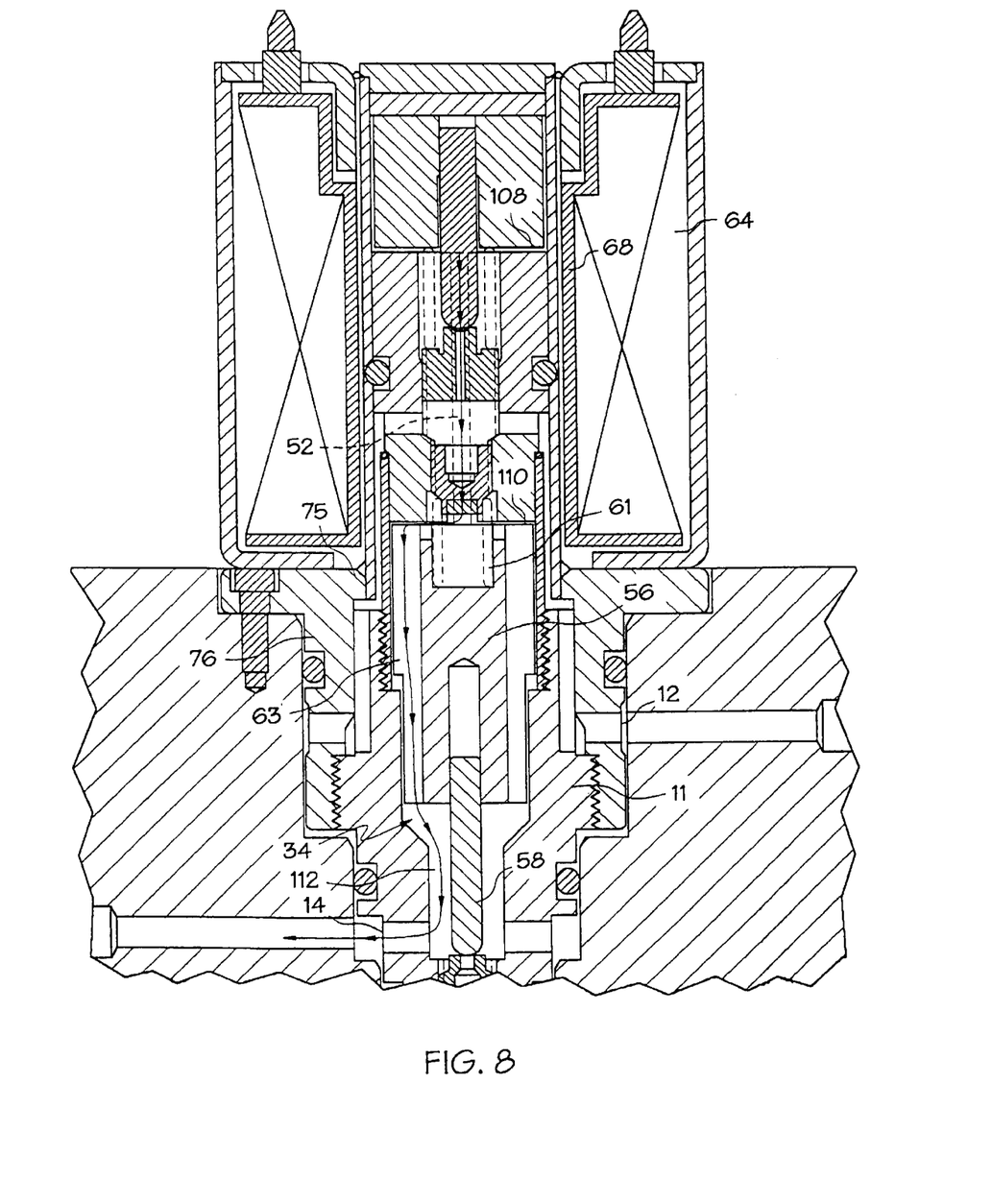
FIG. 8 is a detail side elevation in section of an upper portion of the valve of FIG. 2, illustrating another part of the first fluid path.

FIG. 8 illustrates the flow of fluid from the upper slot 108 to the wheel port 14. Fluid first flows down the offset bore 52 and exits through a lateral slot 110 formed in the top of the armature 56 of the normally closed valve portion 34. The intermediate stator 48 includes a slot 111 (FIG. 4) on its lower surface that intersects with the offset bore 52 to ensure fluid can always flow from the offset bore 52 to the lateral slot 110. After exiting the lateral slot 110, the fluid flows downwardly through one of the slots 63 in the armature 56. The fluid then flows through the chamber 112 in which the plunger 58 for the normally closed valve portion 34 is received, and exits through the wheel port 14.

Because the first fluid path 28, and in particular the inflow path 29, are located radially inwardly of the coil 64, care must be taken to ensure that the secondary air gaps of the valve portions 32, 34 do not become too large. The secondary air gap is the gap in the radial direction that the magnetic flux of the coil 64 must bridge in order to pass through the armatures 36, 56 and the intermediate stator 48. The smaller the gaps, the less current is required to activate the valve portions, and therefore it is desired to minimize the secondary air gap. The magnetic body 74 is shaped to reduce the secondary air gaps in the valve 10. The magnetic body 74 includes a radially-inwardly extending flange 75 that extends radially inwardly of the bobbin 68 of the coil 64. Thus, the magnetic flux of the coil passes through the first fluid path 28, magnetic body 74 (including the flange 75) and central body 76, and the flange 75 on the magnetic body 74 reduces the secondary air gap.

The present invention thereby enables the first fluid path 28 to be located inside the valve 10, yet still provides a small secondary gap. Furthermore, when a number of the valves 10 of the present invention are used in combination in a vehicle, it is relatively easy to attach a preformed set of coils 64 onto the valves. For example, when four valves are used, the valves can be seated in a block that receives four valves therein. The upper portion of the valves will protrude out of the block, and the upper portions must receive a coil 64 thereon. An assembly that includes four coils may then be placed of the four valves in one step, and all of the coils are located on a common plane. This facilities easy assembly and repair of the ABS system, and also enables the use of a conventional electronic board to attach the coils the their respective valves.

Because the normally open valve 32 closes against pressure, it may be proportionally controlled to provide greater control over the braking process. For example, the rate at which fluid is applied to the wheel during the apply step can be controlled using pulse width modulated control. The normally closed valve 34 may also be designed such that it closes against pressure, thereby enabling the normally closed valve 34 to be proportionally controlled. As a result, the valve 10 of the present invention can be easily modified to be used with brake by wire (BBW) technology.

Having described the invention in detail and by reference to the referred embodiments, it will be apparent that modifications and variations hereof are possible without departing from the scope of the invention.

What is claimed is:

1. A full function antilock brake valve comprising:
    a valve body having a master cylinder port, a wheel port, an accumulator port, a first fluid path connecting said wheel port to said master cylinder port, and a second fluid path connecting said wheel port to said accumulator port;
    a normally open valve portion disposed in said valve body for controlling flow of fluid through said first fluid path, said normally open valve portion including an armature having a plunger for selectively controlling flow of fluid through said first fluid path, said first fluid path including an inflow portion for delivering fluid flow from said wheel port to said normally open valve portion;
    a normally closed valve portion disposed in said valve body for controlling flow of fluid from through said second fluid path, said normally closed valve portion including an armature having a plunger for selectively controlling the flow of fluid through said second fluid path;
    a coil located radially outwardly of said normally open valve portion and said normally closed valve portion for actuating said normally open and said normally closed valve portions when said coil is energized, wherein at least part of said inflow portion of said first fluid path is located radially inwardly of said coil; and
    a magnetic body axially spaced from said coil and having a radially inwardly extending flange, said magnetic body reducing a secondary air gap of said normally open valve portion and said normally closed valve portion.

2. The brake valve of claim 1 wherein said flange extends radially inwardly of said coil.

3. A full function antilock brake valve comprising:
    a valve body having a master cylinder port, a wheel port, an accumulator port, a first fluid path connecting said wheel port to said master cylinder port, and a second fluid path connecting said wheel port to said accumulator port;
    a normally open valve portion disposed in said valve body for controlling flow of fluid through said first fluid path, said normally open valve portion including an armature having a plunger for selectively controlling flow of fluid through said first fluid path, said first fluid path including an inflow portion for delivering fluid flow from said wheel port to said normally open valve portion;
    a normally closed valve portion disposed in said valve body for controlling flow of fluid from through said second fluid path, said normally closed valve portion including an armature having a plunger for selectively controlling the flow of fluid through said second fluid path;
    a coil located radially outwardly of said normally open valve portion and said normally closed valve portion for actuating said normally open and said normally closed valve portions when said coil is energized, wherein at least part of said inflow portion of said first fluid path is located radially inwardly of said coil;
    a stator for interacting with said armature of said normally open valve portion and said armature of said normally closed valve portion such that said valve portions are attracted to said stator when said coil is energized; and
    wherein said valve body includes an upper tube that receives said stator therein and a lower tube located radially inwardly of said upper tube such that a gap is formed between said upper tube and said lower tube, and wherein at least part of said inflow portion is located in the gap between said upper and said lower tubes.

4. The brake valve of claim 3 wherein at least part of said armature of said normally open valve portion is located in said upper tube.

5. The brake valve of claim 4 wherein at least part of said stator is located in said lower tube, and wherein at least part of said armature of said normally closed valve portion is located in said lower tube.

* * * * *